(12) United States Patent
Mishne et al.

(10) Patent No.: US 8,612,529 B1
(45) Date of Patent: Dec. 17, 2013

(54) METHOD AND SYSTEM FOR SUGGESTING MESSAGES AND ACCOUNTS FROM A REAL-TIME MESSAGING PLATFORM

(75) Inventors: Gilad Mishne, Albany, CA (US); Pradhuman Jhala, Corte Madera, CA (US); Anand Madhavan, San Francisco, CA (US); Florian Thomas Leibert, Berkeley, CA (US)

(73) Assignee: Twitter, Inc., San Francisco, CA (US)

( * ) Notice: Subject to any disclaimer, the term of this patent is extended or adjusted under 35 U.S.C. 154(b) by 129 days.

(21) Appl. No.: 13/214,594

(22) Filed: Aug. 22, 2011

(51) Int. Cl.
*G06F 15/16* (2006.01)

(52) U.S. Cl.
USPC .......................................... 709/206; 709/205

(58) Field of Classification Search
USPC .................................................. 706/204–206
See application file for complete search history.

(56) References Cited

U.S. PATENT DOCUMENTS

| | | | | |
|---|---|---|---|---|
| 6,965,886 | B2* | 11/2005 | Govrin et al. | 706/45 |
| 7,716,113 | B2* | 5/2010 | Crosthwaite et al. | 705/37 |
| 7,835,974 | B2* | 11/2010 | Burgis et al. | 705/37 |
| 2010/0094878 | A1* | 4/2010 | Soroca et al. | 707/748 |

* cited by examiner

*Primary Examiner* — David Lazaro
*Assistant Examiner* — Marie Georges Henry

(57) ABSTRACT

A real-time messaging platform and method are disclosed which suggests messages and accounts from the real-time messaging platform.

20 Claims, 5 Drawing Sheets

US 8,612,529 B1

METHOD AND SYSTEM FOR SUGGESTING MESSAGES AND ACCOUNTS FROM A REAL-TIME MESSAGING PLATFORM

BACKGROUND OF THE INVENTION

The present invention relates to real-time messaging platforms and, more particularly, for suggesting messages and accounts from a real-time messaging platform.

There are a wide range of known automatic techniques for analyzing content in order to generate suggestions for a user or a set of users of a service. For example, with regard to textual content, there are known techniques from the areas of textual categorization, textual clustering, and entity extraction that can be used to classify the different textual content (there are similar classification techniques for other types of content, such as audio and video). The classification result can then be used to determine what type of other content to associate with the classified content. Such mechanisms have been used to insert related content, such as textual snippets, into websites, as implemented for example in the Google Adsense program. Other techniques, such as collaborative filtering and nearest neighbor approaches have also been devised to generate recommendations without relying on any explicit content analysis.

SUMMARY OF THE INVENTION

A real-time messaging platform and method are disclosed which suggests messages and accounts from the real-time messaging platform. In accordance with an embodiment of the invention, an initial set of user accounts are associated with arbitrary content, such as a website, based for example on prior access statistics regarding the content. The accounts in the real-time messaging platform have associated graph data. A set of suggested accounts in the real-time messaging platform are selected based on the graph data of the initial accounts. The suggested accounts can be selected and ranked based on an advantageous scoring metric, for example, based on counts of a number of users with a pre-specified graph relationship with the suggested account. The suggested accounts are associated with the content so that messages associated with the suggested accounts can be selected for the content. Also, a user's account and content access statistics can be used to generate accounts to suggest to the user using the techniques disclosed herein.

The disclosed technique is thereby capable of generating suggested accounts and associated messages with content without resorting to direct analysis or classification of the content. Alternatively, the content of the website can be analyzed and used as backoff mechanism or to supplement and guide the selection of messages from the real-time messaging platform.

Details of one or more embodiments are set forth in the accompanying drawings and description below.

DETAILED DESCRIPTION

Figure 1:
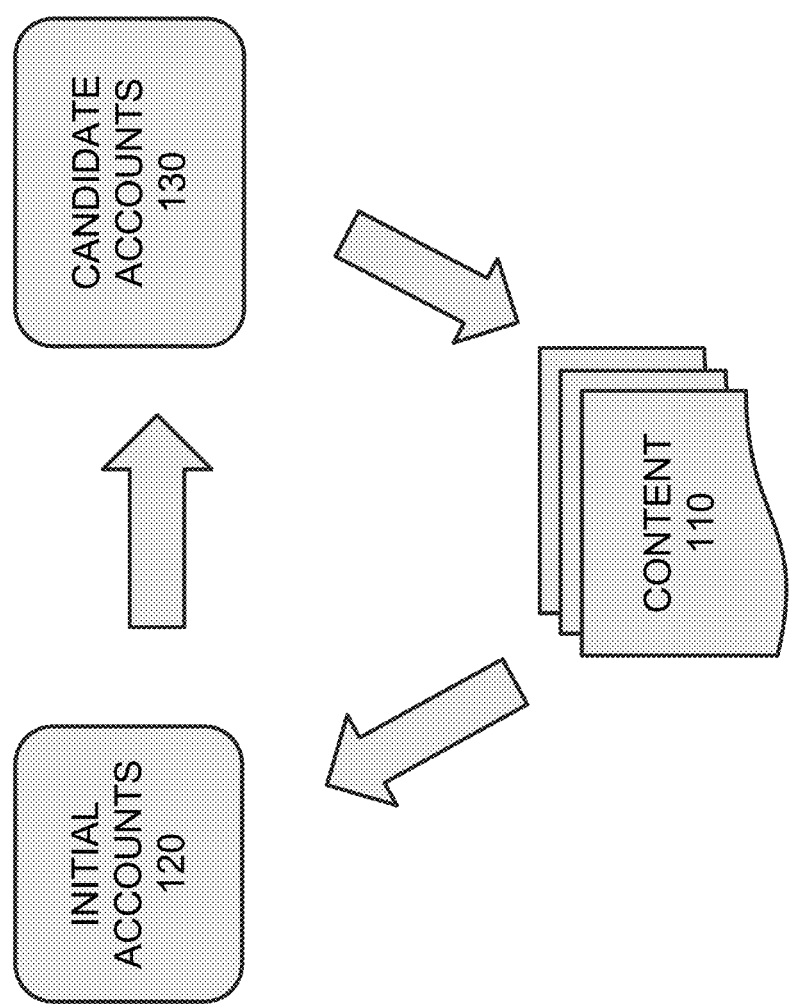
FIG. 1 is a conceptual representation of the relationship between data in the real-time messaging system and the content.

FIG. 1 is a conceptual representation of the relationship between data in the real-time messaging system and the content, when processing is performed in accordance with an embodiment of the invention. It is assumed that the real-time messaging platform, as further described below, facilitates messaging from a set of user accounts, each account having associated user graph data.

FIG. 1 depicts a set of content 110, a set of initial user accounts 120, and a set of suggested accounts 130. The set of content 110 in FIG. 1 can be advantageously virtually any form of content made available to a set of users, e.g., including textual content, audio, visual or some other form of multimedia content. For example, the content can be web pages of a website made available to users through a browser or some other form of presentation client. The content can be some form of audio/visual content broadcast to users through some distribution infrastructure, including television. It is assumed that user statistics are available for the particular content to be processed, as further described herein.

In FIG. 1, a set of initial user accounts 120 is derived from the set of content 110. The initial user accounts 120 are a subset of accounts of users of a real-time messaging platform. The initial user accounts 120 are derived based on prior user accesses or interaction with the content 110, as reflected in content access statistics. The initial user accounts 120 are then used to derive a set of suggested accounts 130 in the real-time messaging platform. The set of suggested accounts 130 is identified based on the user graph data associated with the initial user accounts 120, as further described below. Then, the suggested accounts 130 can be associated with the content so that messages associated with the suggested accounts can be selected for the content. For example, where the content is a website, suggested accounts and associated messages can be inserted into the website, e.g., using a gadget implemented using a browser script. Where the content is a television broadcast, associated messages can be inserted into an overlay or a separate message interface of the broadcast.

Figure 2:
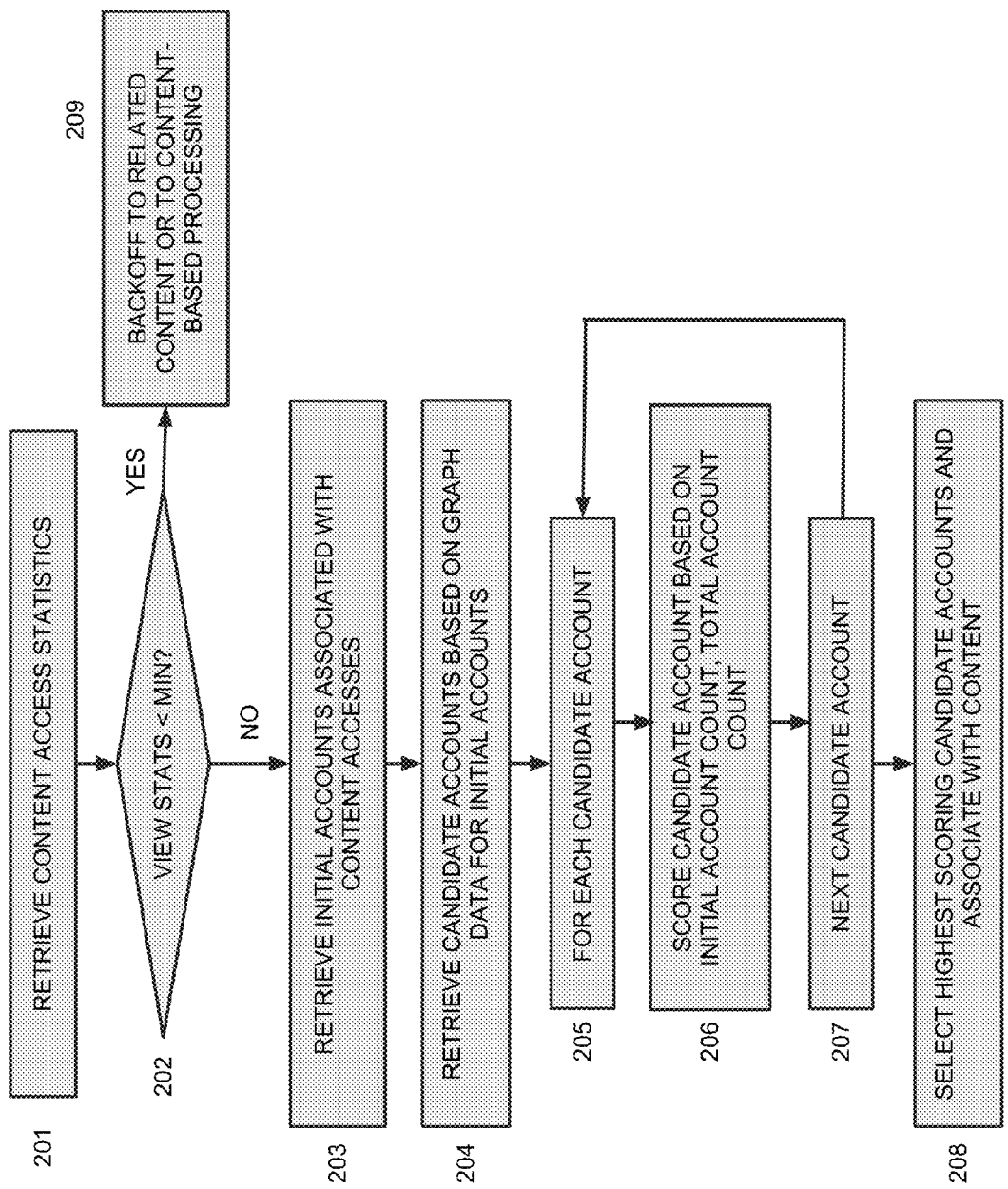
FIG. 2 is a flowchart of processing performed in accordance with an embodiment of an aspect of the invention.
Figure 3:
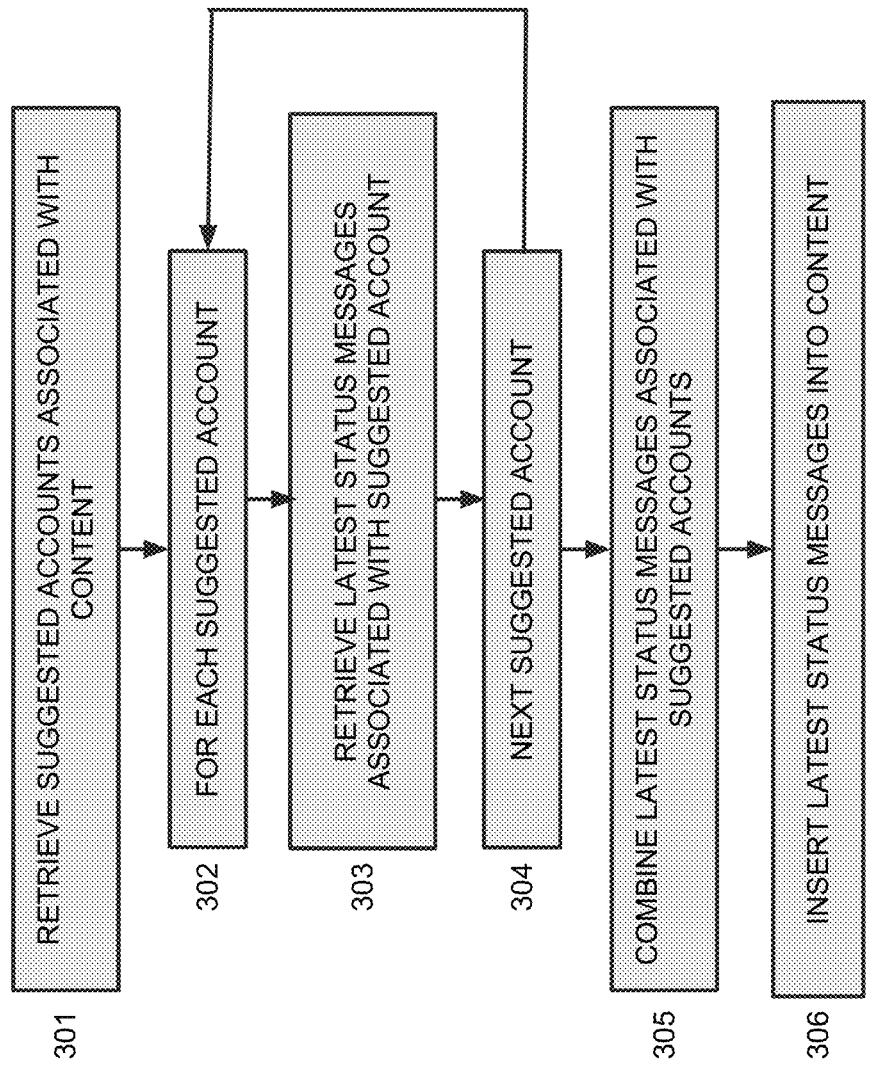
FIG. 3 is a flowchart of processing performed in accordance with an embodiment of another aspect of the invention.

FIGS. 2 and 3 are flowcharts of processing performed in accordance with an embodiment of an aspect of the invention.

At step 201 in FIG. 2, content access statistics are retrieved which reflect prior access or interaction with the content by a set of users. This can reflect, for example, views by users of the content previously. Alternatively, or in addition, it can reflect prior clicks or hover events or other forms of engagement with the content. The content access statistics can be obtained using a number of known techniques, including simple log analysis of user interactions with the relevant content.

At step 202, a determination is made of whether the statistics meet some minimum threshold, e.g., whether the count of views by users is less than some minimum threshold number of viewings. If it does not meet the threshold, then, at step 209, various backoff techniques can be performed. If it does meet the threshold, then processing continues in FIG. 2. The concept of backoff is further described below.

At step 203, the content access statistics are used to identify and retrieve a set of initial user accounts, the initial user accounts associated with the content interactions/accesses. The initial user accounts are a subset of all user accounts in a real-time messaging platform, an embodiment of which is further described below. Each user account is assumed to have associated user graph data reflecting a graph relationship with other user accounts. At step 204, this user graph data from each initial user account is used to retrieve a set of candidate user accounts. For example, the candidate user accounts can be selected from the set of user accounts which are being "followed" by the initial user accounts. The candidate user accounts can comprise all of the user accounts with a certain type of graph relationship with the initial user accounts or can be a subset of all such user accounts with such relationship with the initial user accounts.

At step 205 to 207, each candidate user account in the set of candidate user accounts retrieved in step 204 are scored at step 206. The optimal scoring candidate accounts are then selected and associated with the content at step 208. The score can reflect a sense of the popularity of the candidate user account as a suggested user account for the content.

A variety of scoring metrics can be used. For example, the candidate user accounts can be scored based in part on a number of accounts in the real-time messaging platform with a pre-specified graph relationship in the user graph data. This reflects the intuition that if significant numbers of user accounts who access or interact with the content also have the particular graph relationship to a candidate account in the real-time messaging platform, then this candidate account is likely to be of interest to other users who access the same or related content. Where the user graph data includes a graph relationship based on the concept of "following" another account of interest, for example, a useful scoring metric can be constructed based on a count of "followers" of an account. For example, the scoring metric can be based on the following equation:

$$\text{score} = \frac{F_v}{F} * \frac{\log(T)}{F} \quad \text{(equation 1)}$$

where is a count of followers of the candidate account who also accessed or interacted with the content as part of the content access statistics, F is a count of total followers of the candidate account, and T is a total count of accounts in the real-time messaging platform. This equation is inspired by the concept of term frequency-inverse document frequency weighting schemes in the context of document keyword selection/weighting techniques.

The scoring metric can be based on different variations of the relationship between followers who accessed the content and the total followers of the candidate account, such as:

$$\text{score} = \frac{F_v}{F} \quad \text{(equation 2)}$$

Alternatively, the scoring metric can use a variant where, for example, the square root of the followers is utilized. Alternatively, and without limitation, the scoring metric can take into account statistics from the content access statistics. For example, the scoring metric can be:

$$\text{score} = \frac{F_v}{P} \quad \text{(equation 3)}$$

where P is a statistic derived from the content access statistics, such as a number of page views where the content is a web page. Or the scoring metric can be a combination of the above that takes into account content access statistics, such as:

$$\text{score} = \frac{F_c}{F} * \frac{1}{P} \quad \text{(equation 4)}$$

Alternatively, and without limitation, the scoring metric can take into account a reputational metric derived from the user graph data in the real-time messaging platform. For example, if the count of followers who have accessed the content exceeds some threshold, the score can be assigned the reputational score for the candidate account—or some variant score based on the reputational score for the candidate account. Any advantageous reputational scoring mechanism for the particular user graph data can be utilized. Additionally and alternatively, the scoring metric can take into account other possible signals, such as message location, inferred characteristics about the account, and a variety of other signals about the above-mentioned accounts and messages.

The associations between the suggested accounts and the content can be generated using the processing performed in FIG. 2 and stored and utilized to associate messages with the content in an automated batch mode fashion. FIG. 3 is a flowchart of processing performed using the stored associations to provide messages from the messaging platform in real-time.

At step 301, the suggested accounts associated with the content are retrieved. The content can be identified in any arbitrary manner, including by some form of address, such as by URL or by domain. At step 302 through 304, each suggested account in the list of associated suggested accounts is processed. At step 303, messages associated with each suggested account are retrieved. At step 305, the messages associated with each suggested account are combined. The messages can be combined in any arbitrary organizational manner, for example, by timestamp or by some other organizational metric. Then, at step 306, the combined messages can be associated with the content, for example, by inserting the messages with the content in some advantageous fashion. For example, where the content is a webpage of a website, the messages can be communicated to a gadget or some other embedded script within the webpage for insertion of the messages into the content of the webpage, as further described below.

A variety of mechanisms can be employed to supplement the disclosed techniques. As mentioned above, where the content access statistics for a particular content are insufficient to generate useful suggested accounts, one of a number of different backoff mechanisms can be utilized. For example, statistics for related content can be collected and used with or in lieu of the existing content access statistics. Where the content to be processed is content on a website, e.g., related content from different URLs or content from the rest of the domain can be aggregated or used to generate suggested accounts. Alternatively, and without limitation, content-based mechanisms can be used as an alternative backoff mechanism, or can be used to supplement the above-disclosed techniques. For example, content-based mechanisms which process and analyze the relevant content can be used to supplement the above-disclosed scoring techniques.

Figure 4:
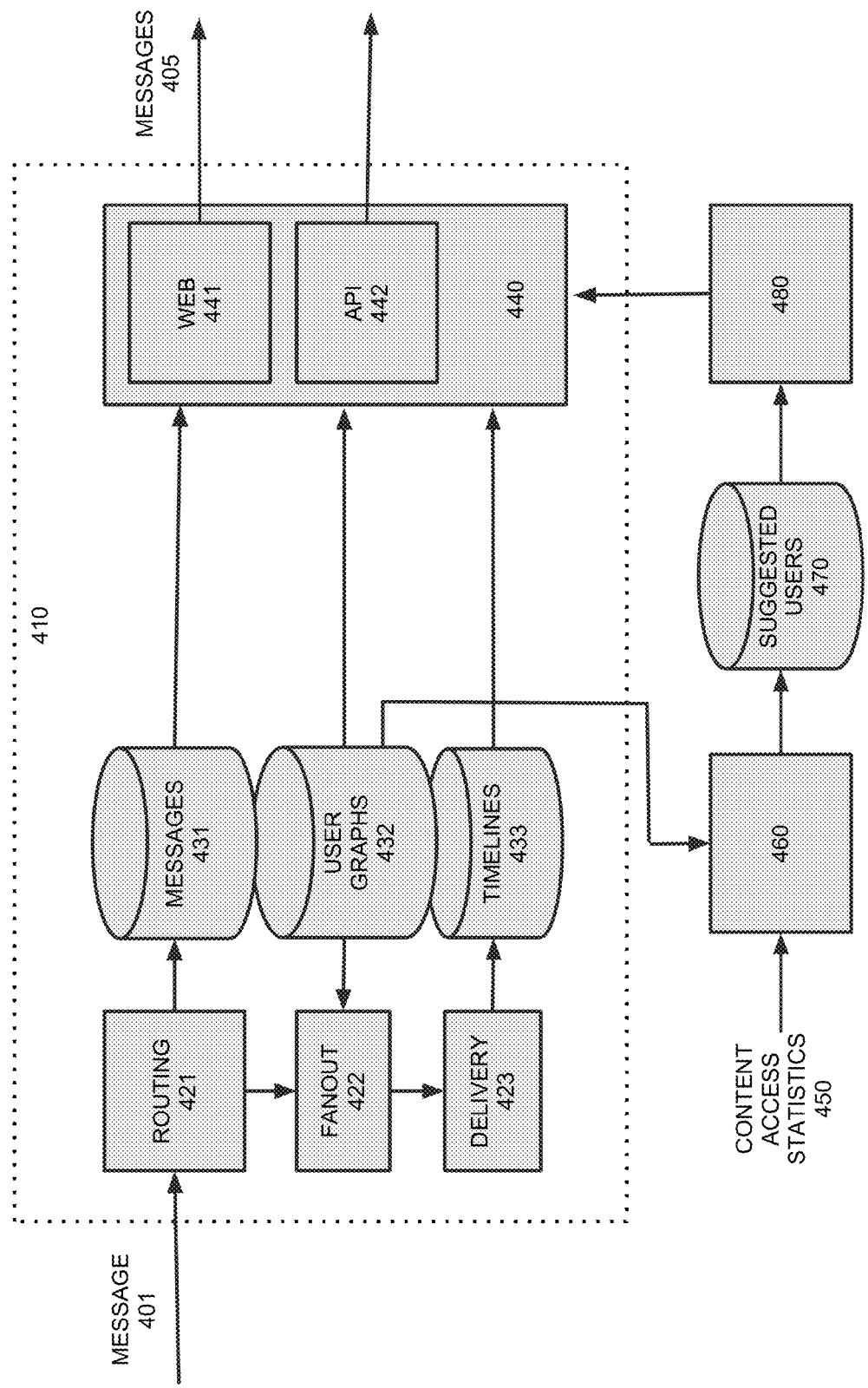
FIG. 4 is a diagram of a real-time messaging platform, suitable for use with an embodiment of the invention.

FIG. 4 is a diagram of an embodiment of a real-time messaging platform 410. The real-time messaging platform 410 includes a routing module 421, a fanout module 422, a delivery module 423, various storage modules 431, 432, 433, and a frontend module 440.

A user of the platform composes a message 401 to be sent from an entry point. The entry point can be based on the operation of any computing device, for example, a mobile phone, a personal computer (laptop, desktop, or server), or a specialized appliance having communication capability. The entry point can utilize any of a number of advantageous interfaces, including a web-based client, a Short Messaging Service (SMS) interface, an instant messaging interface, an email-based interface, an API function-based interface, etc. The message 401 can be transmitted through a communication network to the real-time messaging platform 410.

The routing module 421 in the real-time messaging platform 410 receives the message 401 and proceeds to store the message 401 in a message storage module 431. The message 401 is assigned an identifier. The sender of the message is passed to a fanout module 422. The fanout module 422 is responsible for retrieving user graph data from the user graph storage module 431 and using the user graph data to determine which accounts in the real-time messaging platform 410 should receive the message 401. The user graph data, for example, can reflect which accounts in the real-time messaging platform are "following" a particular account and are, therefore, subscribed to receive status messages from the particular account. The user graph data can reflect more sophisticated graph relationships between the accounts. The delivery module 423 takes the list of accounts from the fanout module 422 and the message identifier generated by the routing module 421 and proceeds to insert the message identifier into message list data associated with each identified account and stored in the message list storage module 433. The message lists stored in the timeline storage module 433 can be a "timeline" of messages associated with the account or can reflect any arbitrary organization of the messages that is advantageous for the user of the account on the real-time messaging platform 410.

The frontend module 440 uses the storage modules 431, 432, 433 to construct message lists for serving to a user of the account on the real-time messaging platform 410. As with the entry point, a user can use any end point to receive the messages 405. The end point can also be any computing device providing any of a number of advantageous interfaces. For example, where the user uses a web-based client to access their messages 405, a web interface module 441 in the front end 440 can be used to construct the message lists and serve the lists to the user. Where the user uses a client that accesses the real-time messaging platform 410 through an API, an API interface module 442 can be utilized to construct the message lists and serve the lists to the client for presentation to the user. Similarly, different forms of message delivery can be handled by different modules in the front end 440. The user can specify particular receipt preferences which are implemented by the modules in the front end 440.

Module 460 can be integrated with the real-time messaging platform 410. Module 460 implements the processing set forth in FIG. 2. Module 460 receives content access statistics 450 and user graph data from the user graph storage module 432 and proceeds to generate suggested accounts associated with particular content, which are stored in the suggested user storage module 470.

Module 470 can also be integrated with the real-time messaging platform 410. Module 470 implements the processing set forth in FIG. 3. Module 470 uses the associations between content and suggested accounts stored in the suggested users storage module 470 to select messages for the content through integration with the front end 440. For example, where the content is an electronic document such as a webpage of a website with a content module, such as a gadget integrated with the content in the website, the content module can call the API interface module 442 through an advantageous API. The front end 440 can then serve messages from the real-time messaging platform 410 for presentation through the gadget with the content on the website.

Each module illustrated in FIG. 4 can be implemented using software executing on generic processing hardware, comprising a processor and memory. Each module can represent a separate process or thread or other execution context running on the same or different machines. Similarly, and without limitation, the modules can be represented through equivalent electrical circuits, microcode, or other implementations of the described functionality.

Figure 5:
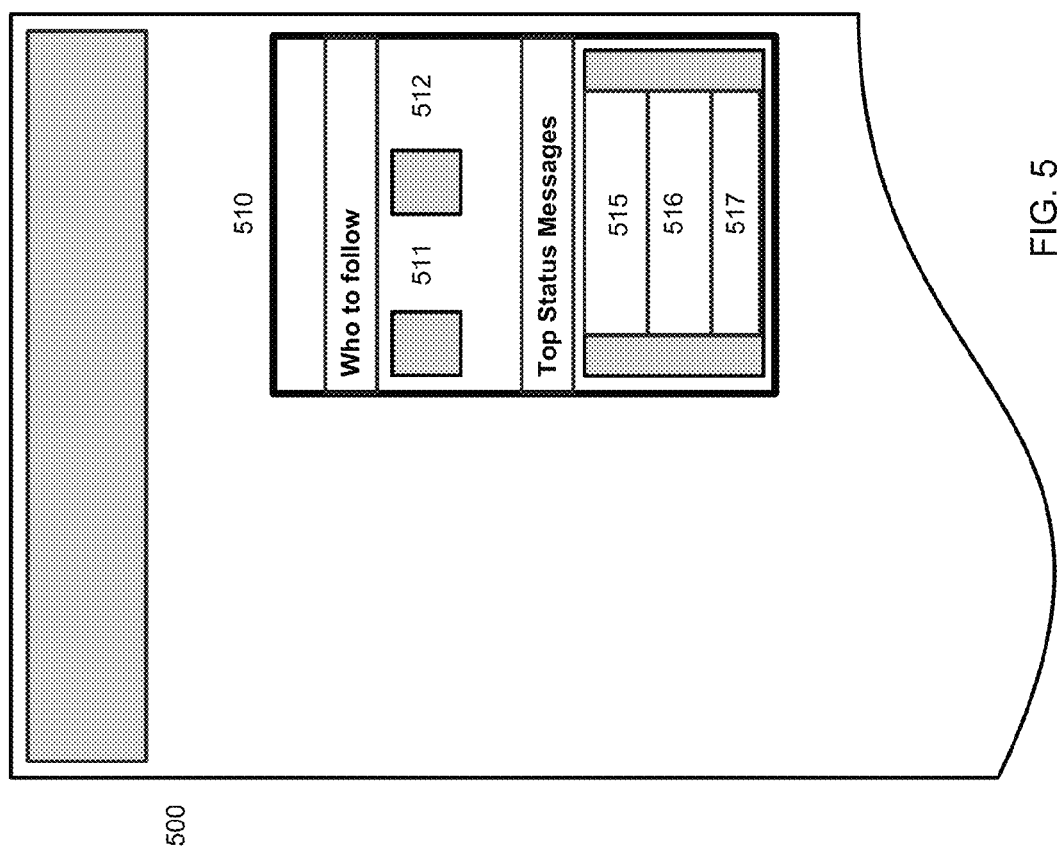
FIG. 5 is a example of a gadget embedded in a webpage, configured in accordance with an embodiment of the invention.

FIG. 5 illustrates an exemplary content module 510 embedded in an electronic document 500 such as a webpage of a website. The electronic document 500 can be embodied as any form of Internet content, e.g., as pages of HTML markup or XML markup or as executable Java or Javascript, etc. The content module 510 can be a separate executable program (such as a plugin) or can be an integrated script, such as Javascript integrated with the rest of the electronic document 500. Content module 510 communicates with the real-time messaging platform 410, for example by communicating with the API interface module 442. The content module 510 provides an identifier, for example, the URL associated with the electronic document 500. The real-time messaging platform 410, using the above-disclosed technique, provides suggested accounts and/or suggested messages associated with the content of the electronic document 500 through the API. As depicted in FIG. 5, content module 510 can display the suggested accounts 511, 512 and the suggested messages 515, 516, 517. Notably, the content module 510 can also be used to include promoted content, such as promoted accounts and promoted messages, along with the suggested accounts and suggested messages.

Multiple embodiments have been described, and it will be understood that various modifications can be made without departing from the spirit and scope of the invention. For example, different forms of content can be processed, as well as different real-time messaging platform architectures can be utilized and different scoring metrics for candidate accounts. Accordingly, other embodiments are within the scope of the following claims.

We claim:

1. A computer-implemented method of operating a real-time messaging platform, the method comprising:

receiving accounts of the real-time messaging platform, the accounts having associated graph data and associated content access statistics, the graph data representing relationships among the accounts, and the content access statistics representing access to a plurality of content items;

selecting, by a computer processor, one or more initial accounts from the accounts of the real-time messaging platform, the initial accounts having accessed a first content in accordance with the content access statistics;

selecting one or more suggested accounts of the real-time messaging platform, the suggested accounts having a pre-specified graph relationship with the initial accounts of the real-time messaging platform in accordance with the graph data associated with the initial accounts of the real-time messaging platform; and storing an association between the suggested accounts and the first content so that messages from the real-time messaging platform associated with the suggested accounts can be selected for presentation with the first content.

2. The method of claim 1 wherein the suggested accounts are selected based on a scoring metric based in part on a count of accounts in the content access statistics with the pre-specified graph relationship.

3. The method of claim 1 wherein each suggested account is selected based on a scoring metric based in part on a count of initial accounts following the suggested account who have also accessed the first content previously.

4. The method of claim 3 wherein the scoring metric is also based in part on a reputational score for the suggested account.

5. The method of claim 1 wherein each suggested account is selected based on a scoring metric based in part on a count of accounts following the suggested account who have also accessed the first content previously in relation to a count of total accounts following the suggested account.

6. The method of claim 1 wherein a backoff mechanism is utilized if the content access statistics do not meet a threshold.

7. The method of claim 1, wherein the first content is a web page, and wherein the content access statistics represent prior visits to the web page by users of the initial accounts.

8. The method of claim 1, further comprising:
determining that the content access statistics fail to exceed a predefined minimum threshold;
identifying, in response to determining that the content access statistics fail to exceed the predefined minimum threshold, a second content related to the first content;
identifying related content access statistics of the second content; and
selecting one or more related initial accounts from the accounts of the real-time messaging platform, the related initial accounts having accessed the second content in accordance with the related content access statistics, wherein the initial accounts are supplemented by the related initial accounts prior to selecting the suggested accounts.

9. The method of claim 1, wherein the first content is a web page, and wherein the method further comprises:
receiving a request for suggested messages, the request identifying the web page;
identifying, based on the association, a plurality of messages authored by the suggested accounts; and
providing, in response to the request, the plurality of messages for display in a gadget inserted into the web page.

10. The method of claim 9, further comprising:
adding a promoted message to the plurality of messages, wherein the promoted message is displayed in the gadget.

11. A computer-implemented method of operating a real-time messaging platform, the method comprising:
receiving accounts of the real-time messaging platform, the accounts having associated graph data and associated content access statistics, the graph data representing relationships among the accounts, and the content access statistics representing access to a plurality of content items;
selecting one or more initial accounts from the accounts of the real-time messaging platform, the initial accounts having accessed a first content in accordance with the content access statistics;
selecting, by a computer processor, one or more suggested accounts of the real-time messaging platform, the suggested accounts having a pre-specified graph relationship with the initial accounts of the real-time messaging platform in accordance with the graph data associated with the initial accounts of the real-time messaging platform; and
ranking the suggested accounts based, at least in part, on a count of accounts having the pre-specified graph relationship with the suggested accounts.

12. The method of claim 11 wherein the suggested accounts are selected based on a scoring metric based in part on a count of accounts in the content access statistics with the pre-specified graph relationship.

13. The method of claim 11 wherein each suggested account is selected based on a scoring metric based in part on a count of initial accounts following the suggested account who have also accessed the first content previously.

14. The method of claim 11 wherein the suggested accounts are displayed to an account at least in part on the ranking.

15. The method of claim 14 wherein the displayed suggested accounts include promoted accounts.

16. The method of claim 11, further comprising:
determining that the content access statistics fail to exceed a predefined minimum threshold;
identifying, in response to determining that the content access statistics fail to exceed the predefined minimum threshold, a second content related to the first content;
identifying related content access statistics of the second content; and
selecting one or more related initial accounts from the accounts of the real-time messaging platform, the related initial accounts having accessed the second content in accordance with the related content access statistics, wherein the initial accounts are supplemented by the related initial accounts prior to selecting the suggested accounts.

17. The method of claim 13, further comprising:
receiving a request for account suggestions, the request identifying the first content; and
providing, in response to the request, at least a portion of the suggested accounts in an order of the ranking.

18. A real-time messaging platform comprising:
a computer processor;
a storage module storing accounts, the accounts having associated graph data and associated content access statistics, the graph data representing relationships among the accounts, and the content access statistics representing access to a plurality of content items;
a module executing on the computer processor and configured to:
select one or more initial accounts from the accounts of the real-time messaging platform based on the associated content access statistics, the initial accounts having accessed a first content in accordance with the content access statistics; and
select one or more suggested accounts of the real-time messaging platform, the suggested accounts having a pre-specified graph relationship with the initial accounts of the real-time messaging platform in accordance with the graph data associated with the initial accounts of the real-time messaging platform; and
rank the suggested accounts based, at least in part, on a count of accounts having the pre-specified graph relationship with the suggested accounts.

19. The real-time messaging platform of claim 18, the module further configured to:
determine that the content access statistics fail to exceed a predefined minimum threshold;
identify, in response to determining that the content access statistics fail to exceed the predefined minimum threshold, a second content related to the first content;

identify related content access statistics of the second content; and select one or more related initial accounts from the accounts of the real-time messaging platform, the related initial accounts having accessed the second content in accordance with the related content access statistics, wherein the initial accounts are supplemented by the related initial accounts prior to selecting the suggested accounts.

20. The real-time messaging platform of claim 18, further comprising:

a frontend module configured to:

receive a request for account suggestions, the request identifying the first content; and provide, in response to the request, at least a portion of the suggested accounts in an order of the ranking.

* * * * *